July 10, 1951        L. DUBIN        2,559,606

PULSE WIDENER AND MARKER SEPARATOR

Filed July 21, 1948

INVENTOR.
LESTER DUBIN

BY

*R P Morris*

ATTORNEY

Patented July 10, 1951

2,559,606

UNITED STATES PATENT OFFICE 2,559,606

PULSE WIDENER AND MARKER SEPARATOR

Lester Dubin, Brooklyn, N. Y., assignor to International Standard Electric Corporation, New York, N. Y., a corporation of Delaware Application July 21, 1948, Serial No. 39,967

2 Claims. (Cl. 179—15)

This invention relates to multichannel receiving systems and more particularly to means for widening the transmitted pulses upon reception and for separating synchronizing pulses from intelligence signal pulses.

One of the objects of the invention is to provide a method and means for widening such pulses as are used in a so-called pulse time modulation system.

Another object is to provide means for separating the modulation pulses from the synchronizing pulses in a multichannel system of reception.

Still another object of my invention is to provide a circuit arrangement which is adapted for use in connection with a demodulating system of the type wherein signals are composed of time displaced pulses representing amplitude variations of the intelligence signals.

In a so-called pulse time modulation system of intelligence transmission which is also a multiplex system, it is desirable to secure a greater initial energy output to lengthen the effects of the transmitted pulses. The pulses as received are of the order of one-half a microsecond in duration to permit channel spacings which will serve to reduce cross-talk, but for the sake of improved efficiency in the demodulation process the received pulses should be of greater time duration, for example, of the order of 1 microsecond. So, upon reception, the receiving equipment must be capable of widening the received pulses to an equivalent length, say of 2 microseconds duration. According to my invention I accomplish this result by widening the keying pulse upon reception.

In carrying out my invention I cause the intelligence signals composed of keying pulses to be widened by the use of passive circuits which are negligibly subject to cross-talk. According to a feature of my invention this widening is accomplished by passing the received pulse trains through two parallel circuits one of which introduces a delay signal to the pulse duration desired. The pulses of these trains are then used in conjunction with a storage circuit to accomplish the desired broadening. In accomplishing this result I obtain a further advantage in that the circuit arrangement provides for the separation of a synchronizing pulse for purposes of timing the sweep circuit generator for the cathode ray tube.

My invention will now be described in more detail, reference being made to the accompanying drawing in which—

Figure 1:
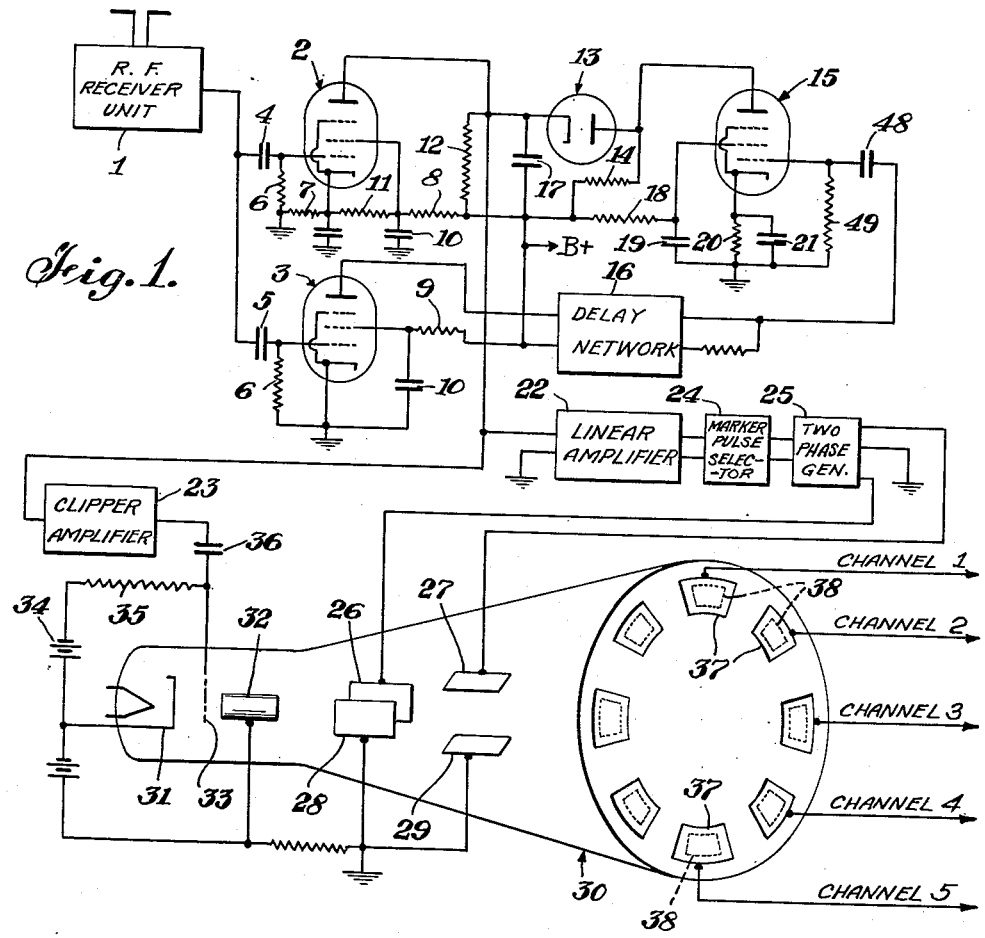
Figure 2:
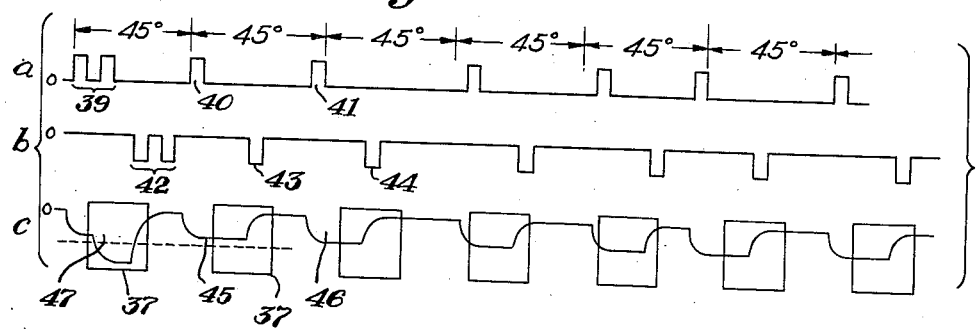

Fig. 1 shows a circuit diagram including essential components for carrying out the invention according to one exemplary embodiment; and Fig. 2 shows by way of illustration certain graphs of the signals and of the demodulation effects, these graphs being used to explain the operation of the system of Fig. 1.

As a preface to the detailed description of my invention it may be well to refer briefly to the prior art as a background for systems which utilize the pulse time modulation method. These systems, generally speaking, are so organized that the intelligence may be transmitted by a series of pulses for each channel, the pulses being displaced in accordance with the amplitude of the modulation. For example, if there were no modulation, the pulses would be spaced equidistantly in point of time. For a given amplitude of the modulation signal the pulse is displaced and the degree of time displacement corresponds to the amplitude. Where a number of channels of communication are to be multiplexed, each channel is represented by a train of pulses which are interwoven with the pulses of other channels.

The receiving equipment may be provided with an electron beam distributor tube having a series of targets for separation of the signals into their respective channels. The tube may be provided with beam deflecting circuits of the type which produce rotary scanning. On the other hand, the scanning principle may be the same as is commonly used for television. For purposes of illustration I have shown herein a rotary scanning method. I do not intend, however, to limit the use of the invention to such a method.

In a copending application filed by E. Labin and D. Grieg, Serial Number 565,152, filed November 25, 1944, there has been described a receiving system which deals with demodulation of transmitted pulse time modulation signals. In that application there was shown and described a cathode ray tube having a plurality of targets for impingement of the electron beam in order to separate the signals. The targets for different channels were disposed behind an orificed screen. The scanning means produced rotary beam deflection. The incoming signals consisted of intelligence signals for each channel and a periodic synchronizing pulse which was differentiated from the intelligence signals by being of longer duration. The means provided for separating the synchronizing signals from intelligence signals need not be herein discussed since I have adopted alternative means. This matter will be better understood after describing the circuit.

Referring first to Fig. 1, I show therein a radio frequency receiver unit 1, the output from which is coupled in parallel to the control grids of two electron discharge tubes 2 and 3. The coupling means may be, for example, capacitors 4 and 5 respectively. The tubes 2 and 3 are shown by way of example to be pentodes. Other types of tubes may be adopted if preferred.

The input circuits for tubes 2 and 3 are conventional in that they include resistors 6 connected between the control grid and ground. The cathode of tube 2 has a resistor 7 connecting it to ground. The cathode of tube 3 is directly grounded. Screen grid potential is supplied from a source indicated as +B connected to the different screen grids by way of resistors 8 and 9 respectively. These screen grids are shown having by-pass capacitors 10 coupling them to ground. Resistors 8, 11 and 7 are interconnected as a voltage divider between the plus and minus terminals of the B source, the minus terminal being understood to be grounded. Resistor 11 forms an interconnection between the cathode and the screen grid in tube 2.

The anode in tube 2 is supplied with positive potential from the +B terminal through a resistor 12. This anode is also connected to the cathode of a diode discharge tube 13, and is further connected to other components, as will be hereinafter mentioned. The anode of tube 13 is connected to the +B source through a resistor 14. The anode of tube 13 is also connected directly to the anode of another pentode tube 15.

The output from tube 3 is applied to the input of delay network 16. Output potentials from the delay network 16, which are phase-displaced with respect to the output from tube 3, by an amount equal to the desired widening are applied to the control grid of tube 15. The anodes of tubes 15 and 13 are interconnected. Negative pulses from tube 2 tend to build up a negative potential in storage capacitor 17, while the positive pulses applied to diode 13 from the output of tube 15 tend to discharge capacitor 17. Resistor 41 is of sufficiently high value as to have a negligible shunting effect on condenser 48. The result is effectively to broaden the keying pulses which constitute the incoming signals to a value corresponding with the delay in network 16. Other circuit components of tube 15 are conventional. They include a biasing resistor 18 for the screen grid, and a by-pass capacitor 19 coupling the screen grid to ground. The cathode resistor 20 shunted by a capacitor 21 affords a ground connection for the cathode.

Variations of potential across capacitor 17 are utilized in two units which are connected to it in parallel, one of these units being a linear amplifier 22 and the other being a clipper amplifier 23. The output from the linear amplifier is fed to a marker pulse selector 24 which selects the marker or synchronizing pulses for causing a 2-phase generator to be locked in step. The unit 24 responds only to the marker pulses because they are of longer duration. Unit 24 delivers its output to 2-phase generator 25 from which deflecting circuit potentials are obtained in 90° phase displacement for purposes of rotary scanning. One of the output conductors from unit 25 leads to a beam deflector electrode 26. Another such output conductor leads to a beam deflector electrode 27. Electrode 26 is capacitively associated with a grounded electrode 28, electrode 27 being likewise capacitively associated with grounded electrode 29. The neutral point in the phase splitting circuit of the generator 25 is also grounded.

The deflecting electrodes 26, 27, 28 and 29 are built into a cathode ray tube 30 having the usual electrodes for forming an electron gun. The components of the gun include a cathode 31 and focusing electrode 32. Intervening between the cathode and the focusing electrode 32 is a control grid 33. For one embodiment of the invention the grid 33 has a suitable cut-off bias as obtained from a direct current source 34 connected through a resistor 35. Signals are applied to the control grid 33 through a capacitor 36 coupled to the output from the clipper amplifier unit 23. The input side of unit 23 is connected to the anode of tube 2 as before stated.

A plurality of targets or output electrodes 37 is mounted at the large end of the cathode ray tube in opposition to the electron gun. Intervening between the gun and the targets a mask or aperture plate is also provided. This mask is not delineated except by broken lines which outline certain orifices therein as at 38.

Before explaining the principles of operation of my invention, it should be understood that, according to the prior art, demodulation of signals by means of a cathode ray tube such as that herein shown as tube 30 is somewhat as follows:

The beam, in its movement, is caused to either traverse the targets or to move along a path adjacent the same. The time modulated pulse energy may be used to control coaction between the beam and each target or responsive device in any one of several ways. This coaction between the beam and the responsive devices causes a flow of energy in the channel receiving circuit associated with each device, the amplitude of such energy being proportional to the time modulation of the pulses of the corresponding channel. According to one feature of the prior art invention, the coaction between the beam and the responsive devices is effected by keying the beam on and off according to the leading and trailing edges of the pulses. Where this type of control is employed, the beam sweep is caused to traverse successively the same responsive devices during the same corresponding parts of its cyclic movement, whereby the keying on and off of the beam in relation to such parts controls the coaction referred to.

According to another feature of the prior art invention, the control of the coaction between the beam and the sensitive devices is effected by deflecting the beam according to the pulse energy. For example, the beam is caused normally to sweep, in the absence of signal modulated pulses, and at a given intensity, along a path adjacent the responsive devices. When the beam is deflected by a channel pulse, it is caused to coincide with one of the responsive devices for a time interval proportionally to the degree of the time modulation of the deflecting pulse energy, thereby producing a corresponding flow of energy in the receiving channel of the beam intercepting device.

This coaction, according to still another feature of the prior art invention, may be effected by applying the pulse energy to a given element of each of the responsive devices whereby the devices are made responsive to the beam only when the pulse energy is applied to such elements. The beam in this case is maintained at a constant intensity and its path of movement is caused to coincide successively with the responsive devices.

The displacement of the signal pulses in point of time causes a certain variation of amplitude of output from the target 37 and depends upon the proportion of intercepted electrons to electrons which reach the targets. If, therefore, a signal pulse is applied to the control grid 33 in the cathode ray tube at a time when the deflecting circuits deflect the beam into a portion of its rotary orbit between the orifices of the mask, few, if any, electrons will reach a target. If, however, time displacement causes the signals to be applied to the grid 33 when beam deflection would permit the passage of the electrons through an orifice 38, then the target 37 would receive sufficient electrons to shift its bias in a negative direction. This effect, may, of course, be utilized in each channel of a multiplex system where a separate target is provided for each channel. The utilization means connected to each target are not herein shown, but they will be well understood as being of any suitable type for the kind of intelligence that is to be received whether it be voice signals or video signals of a television system or facsimile signals.

Coming now to a description of the mode of operation of my invention, it should be borne in mind that the invention itself aims to widen the effects of the received pulses and thus to enable the tube 30 to function with improved efficiency. This is only one advantageous result to be obtained, however, because the circuit arrangement is adapted to differentiate between signal pulses and marker pulses in an advantageous manner. While I have illustrated only the type of circuit in which the beam is keyed on or off by the received pulses it should be clear that the advantages of pulse widening apply equally well to other type of circuits.

Referring to Fig. 2 and to curve $a$ therein, this represents graphically a typical incoming signal as it is amplified in the receiver unit 1. The marker signal is composed of two pulses which are included in the time represented by the bracket 39. The marker pulse is used for synchronizing only. The curve $a$ then continues with a series of pulses, each appropriate to a different multiplex channel. One of these pulses 40 may occur before or after a moment that has a constant reference time relation to the marker pulse 39. The phasal variation in the arrival time of the pulse 40 is what constitutes the modulation. Pulse 41 appropriate to a different channel may also vary in the instant of arrival time with respect to the reference moment measured from the marker pulse.

As explained above, the instant of arrival of each signal pulse varies in accordance with the amplitude of the signal at a corresponding instant and, therefore, demodulation of the signal is obtained by allowing more or less of the electrons from the electron gun to reach the targets 37.

Curve $b$ in Fig. 2 represents delayed inverted pulse train at the input of tube 15. Tube 13 is subject to intermittent conductive action in response to the pulse of curve $b$, while the output pulses of curve $a$ serve to build up a negative charge in condenser 17, thus producing a fluctuating charge on capacitor 17, timed with the incoming pulse train producing a resultant pulse train, as shown by curve $c$ in Fig. 2. The pulses 40, 41 etc. are thus widened as indicated at 45, 46 of curve $c$. These wider pulses have the effect of releasing more energy at targets 37, as illustrated, than would be produced by the narrower pulses received. The double marker pulses like those bracketed at 39 and 42 are amplified in the unit 22, producing a pulse of greater negative amplitude as shown at 47. After being applied to the marker pulse selector 24 they alone are of sufficient amplitude to overcome the cut-off bias in marker pulse selector 24, indicated by the line 45, curve $c$. So these marker pulses are used to maintain synchronism in the operation of the deflecting circuit generator 25. This unit 25 possesses a phase splitting means, or is any desired type of 2-phase generator which may be synchronized with the separated marker pulses to deliver suitable potentials for application to the beam deflecting electrodes 26 and 27.

By way of illustrating the variable degree of collection of electrons on the targets 37, as a function of the phase of displacement of the signal pulses, curve $c$ has been drawn through certain rectangles which represent the targets. The phase, or time displacements of the pulses therefore produce effects which correspond to the amplitude variations of the original modulations. The advantage to be derived from the elongation of the pulses will be best understood by considering that the width of the incoming pulses such as represented at 40 or 41 may be so narrow as to cause a relatively short time of contact with the targets. On the other hand, with elongation of the signals, the energy delivered by the electron beam as it strikes a target is effective for a greater period than that of the incoming pulses. The target element corresponding to the marker pulse 39 may be eliminated as it is not needed for synchronizing the sweep. The elongation of the pulses is uniform and does not vary with the phase displacement. This is because the delaying action of the network 16 is constant. This means that the time relation between two pulse components 40 and 43 is a constant, and is equal to that between pulse components 41 and 44. The spacing between the front slopes of the signal pulses varies, however, in accordance with the modulation and thus provides the possibility for translation of the incoming signals into intelligence.

Although I have described my invention by reference to a particular embodiment thereof, it will be understood that variations may be made by those skilled in the art without departing from the spirit and scope of the invention itself.

I claim:

1. A receiver for multi-channel pulse trains in which individual trains of signal pulses, the pulses of each train being time displacement modulated according to signals in different channels, are interleaved in the form of a single multi-channel train with marker signals inserted at regular intervals in said multi-channel train, comprising means for receiving said multi-channel trains, means for widening each of the pulses of said train while maintaining the time displacement modulation thereof, a cathode ray tube channel distributor and demodulator of the type in which the signal pulses are applied to the grid thereof to key the beam and in which the beam is cyclically deflected with regular periodicity, the cross section of the beam and the target elements being so arranged that the time displacement of the pulses varies the amount of electrons striking the target elements so that the energy in the output of each of said target elements varies in accordance with the time displacement modulation, each target element providing at its output the pulses belonging to a separate channel, means for applying the widened pulses to the grid of said cathode ray tube, means for selecting the marker signal and means controlled by said marker signal for regularly cyclically deflecting the beam, said marker signals each consisting of two adjacent pulses spaced more closely together than any other two pulses in said multi-channel train and said means for separating the marker signal and the means for widening the signal pulses comprising a storage device, means for applying each of the pulses of the multi-channel train to sequentially charge said device, means for delaying the multi-channel train for a period greater than the period between the two adjacent pulses of the marker signal and less than the period between any other two pulses of the train, means for applying the delayed pulses to each discharge said storage device whereby the periodic voltage built up on said storage device by the marker pulses of the undelayed train are greater than the corresponding voltage of the signal pulses, a threshold device coupled to said storage device having a threshold level above said corresponding voltage and below said periodic voltage whereby the marker signal is selected, and means coupling said storage device to the grid of said cathode ray tube.

2. In a channel distribution system for a receiver of multi-channel pulse trains in which individual trains of signal pulses, the pulses of each train being modulated according to signals in different channels, are interleaved in the form of a single multi-channel train with marker signals inserted at regular intervals in said multi-channel train, said marker signals each consisting of two adjacent pulses spaced more closely together than any other two pulses in said multi-channel train; a marker signal separator comprising a storage device, means for applying each of the pulses of the multi-channel train to sequentially charge said device, means for delaying the multi-channel train for a period greater than the period between the two adjacent pulses of the marker signal and less than the period between any other two pulses of the train, means for applying the delayed pulses to each discharge said storage device whereby the periodic voltage built up on said storage device by the marker pulses of the undelayed train are greater than the corresponding voltage of the signal pulses, and a threshold device coupled to said storage device having a threshold level above said corresponding voltage and below said periodic voltage whereby the marker signal is selected.

LESTER DUBIN.

REFERENCES CITED

The following references are of record in the file of this patent:

UNITED STATES PATENTS

| Number | Name | Date |
|---|---|---|
| 2,405,069 | Tonks | July 30, 1946 |
| 2,419,340 | Easton | Apr. 22, 1947 |
| 2,485,591 | Grieg | Oct. 25, 1949 |